United States Patent [19]

Hegland et al.

[11] Patent Number: 4,692,616
[45] Date of Patent: Sep. 8, 1987

[54] BASIS WEIGHT GAUGE STANDARDIZING METHOD AND SYSTEM

[75] Inventors: Philip Hegland, San Jose; Lee Chase, Los Gatos, both of Calif.

[73] Assignee: Measurex Corporation, Cupertino, Calif.

[21] Appl. No.: 589,607

[22] Filed: Mar. 14, 1984

[51] Int. Cl.⁴ .......................................... G01D 18/00
[52] U.S. Cl. .............................. 250/252.1; 250/358.1
[58] Field of Search ................. 250/252.1, 308, 358.1, 250/359.1; 378/54, 55, 56

[56] References Cited

U.S. PATENT DOCUMENTS 3,681,595  8/1972  Dahlin ............................ 250/252.1

Primary Examiner—Janice A. Howell
Attorney, Agent, or Firm—Hal J. Bohner

[57] ABSTRACT

A system and method are disclosed for standardization a basis weight gauge for measuring the weight per unit area of sheet material. The method includes the calibration steps of obtaining two calibration curves, one of which is displaced from the other by a dirt simulation technique.

The displacement between the two curves is expressed as a third curve. A standard sample of a pre-determined basis weight is inserted in the radiation path to provide a standard shft in conjunction with the dirt simulation to provide a reference value for the displacement function curve. During operation of the basis weight gauge, standardization is provided by relating a current standard shift to the initial standard shift to correct the displacement function curve, based upon the value of the third curve at a point corresponding to a measured transmission ratio.

8 Claims, 2 Drawing Figures

BASIS WEIGHT GAUGE STANDARDIZING METHOD AND SYSTEM

BACKGROUND OF THE INVENTION

1. The Field of the Invention

The present invention is directed to a method of standardizing a basis weight gauge and more particularly to a method in which the gauge scans sheet material.

2. Description of the Prior Art

Due to the extreme ambient conditions under which basis weight gauges must operate there is an inherent tendency of the parameters of the gauge to drift. A portion of this drift is due to temperature changes and another portion to dirt buildup in the radiation path of the gauge. Thus, the gauge indication of basis weight must be compensated or standardized.

One method of standardization is disclosed in U.S. Pat. No. 3,681,595 in the name of Dahlin and assigned to Measurex Corporation. The patent teaches a method of standardizing a basis weight gauge for measuring the weight per unit area of a sheet material. The gauge has a radiation source and radiation detector with a gap therebetween for directing radiation along a path toward the material and for detecting the amount of radiation transmitted through the material. The transmitted radiation is a measure of the basis weight of the material substantially in accordance with Beer's law. The gauge as taught in the patent also includes standard means having a predetermined and stable basis weight and movable to be interposed in the radiation path.

The method includes the following steps: (a) providing at least one reference sample of a material having a measured basis weight; (b) placing the reference sample in the gap and obtaining a measurement of the radiation transmitted through the sample; (c) constructing a first calibration curve from the measurement of the material of known basis weight, the curve relating basis weight as a function of transmitted radiation substantially in accordance with Beer's law; (d) constructing a second calibration curve by the simulation of dirt in the radiation path whereby the second curve is displaced from the first curve; (e) placing the standard in the gap and measuring an initial shift due to the dirt simulation; (f) obtaining a function of the calibration curve displacement as a function of one of the two variables of the calibration curves; (g) updating the displacement function for the effect of current ambient conditions including the effects of air density changes due to temperature variation and other temperature effects and dirt buildup in the radiation path including the steps of
  (1) scanning offsheet and obtaining a current value of transmitted radiation with no sheet material in the radiation path but with the standard in the path to obtain a current standard shift,
  (2) updating the displacement function by relating the current standard shift to the initial standard shift; and
(h) scanning the sheet material and measuring the current transmitted radiation and relating the updated displacement function to the first calibration curve along with such current measurement to obtain a standardized basis weight value.

The method of standardizing according to the patent is suitable for many purposes, but it has certain drawbacks. For example, in some materials such as bi-axially oriented plastic film the basis weight varies significantly across the sheet. In such a case the system described in the patent may not be completely effective.

OBJECTS OF THE INVENTION

It is, therefore, an object of the present invention to provide an improved method of standardizing a basis weight gauge.

It is another object of the invention to provide a method as above which is extremely accurate regardless of variations in the basis weight of the sheet being measured.

DETAILED DESCRIPTION OF THE PREFERRED EMBODIMENT

During the manufacturing process, a characteristic of a web or sheet material such as paper or plastic can be measured by mounting a radiation detector and a radiation source on a carriage. The carriage scans in a cross direction while the sheet material is moving in a machine or perpendicular direction to the cross direction. A scanner is provided which includes a framework having a pair of spaced upper and lower parallel beams and which extend laterally across the sheet material which is being produced. Upper and lower gauging heads are provided in a framework and are adapted to travel longitudinally along the framework and transversely across the sheet.

The scanning system will not be described in detail because such systems are known, for example, from the teachings of U.S. Pat. No. 3,681,595, discussed above.

Figure 1:
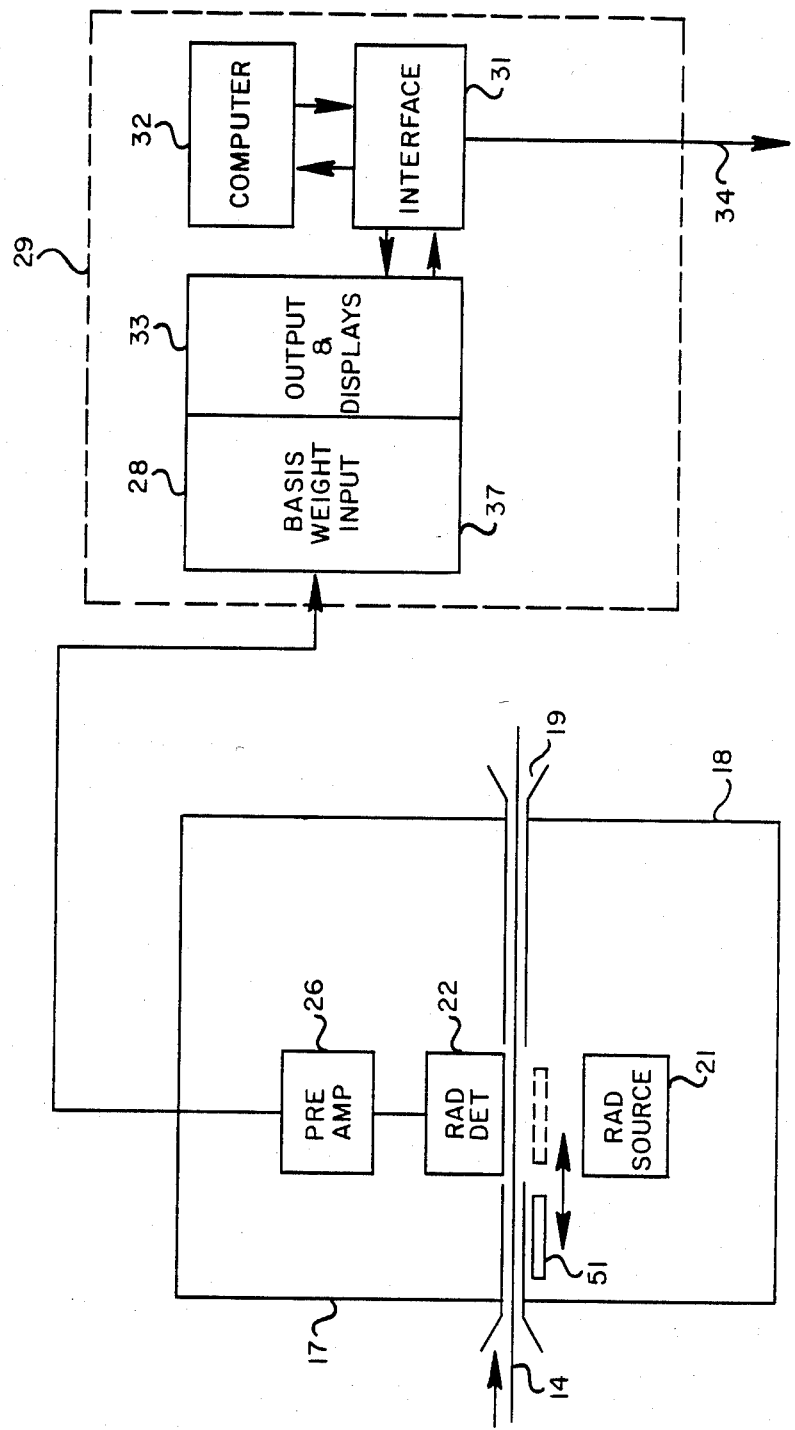
FIG. 1 is a schematic illustration of certain of the equipment and electronics utilized in the present invention.

According to the present embodiment, and with reference to FIG. 1, paper sheet 14 travels through a gap 19 provided between the gauging heads 17 and 18. The drive for the gauging heads is such that they can be moved offsheet or in other words, off to the side of the sheet during each direction of travel.

The lower gauging head 18 contains a radiation source 21 which emits radiation that is directed along a radiation path toward the paper 14. The radiation can be of the beta, gamma, or x-ray type, and other types of radiation can be appropriate in certain circumstances provided that the radiation is absorbed by the material being measured substantially in accordance with Beer's law. The intensity of radiation which is transmitted through the paper 14 is sensed by a radiation detector 22. In other words, the radiation detector senses the amount of radiation absorbed by the material which gives a direct indication of the basis weight of the material. This is in substantial accordance with Beer's law which is expressed as follows:

$$I = I_0 e^{-\mu x} \qquad (1)$$

Where e is the natural log base, $\mu$ is the mass absorption coefficient which is a function of the radiation energy from the source and of the type of material being measured, x is the weight per unit are of the material being measured in terms of milligrams per square centimeter, $I_o$ is the intensity of radiation reaching the radiation detector in the absence of the absorbing material, and I is the intensity of radiation reaching the detector in the presence of the radiation absorbing the material.

Still referring to FIG. 1, the radiation source 21 preferably emits beta radiation for the measurement of basis weight. A preamplifier 26 is coupled to the radiation detector 22 to process the radiation events counted by detector 22 and the output of discriminator 26 is coupled to a basis weight input unit 28. The basis weight unit 28 is part of an overall digital process unit 29 which in conjuntion with an interface unit 31 and a computer 32 processes the raw information from the gauging head 17 to provide an input at unit 33 of the actual basis weight of the web, for example, in graphical form. In addition, interface unit 31 has an output at 34 which may be used to control actual parameters of the paper machine or sheet material.

Standard means 51 having a predetermined and stable basis weight is provided which may be selectively interposed in the radiation path between source 21 and detector 22. In practice the standard means can include a polyester disc of a predetermined and stable basis weight which is cemented across a frame. The frame is pivoted for rotation on a shaft which is driven through a universal joint by a rotary solenoid unit. Operation of the standard unit is controlled by the digital processing unit illustrated in FIG. 1.

Figure 2:
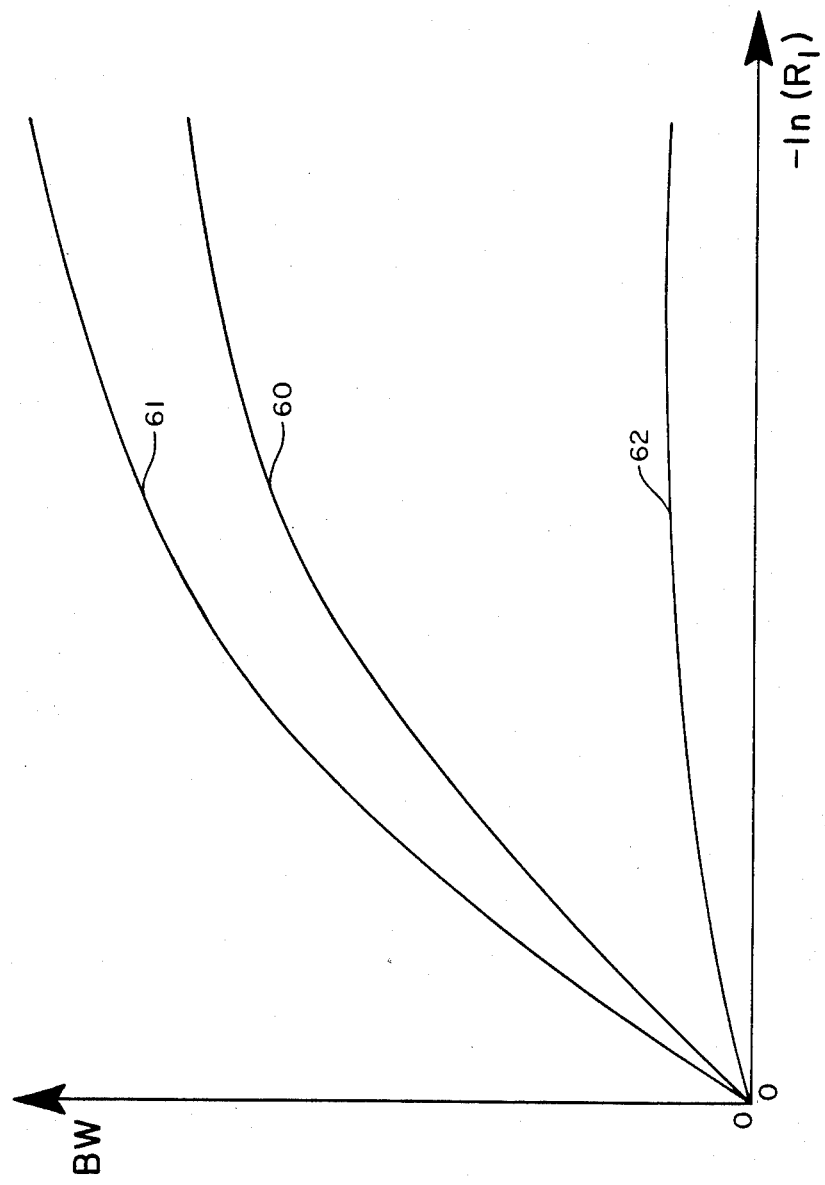
FIG. 2 shows several curves useful in understanding and practicing the present invention.

In accordance with the method of the present invention calibration of the basis weight gauge is carried out by first obtaining the curves shown in FIG. 2. Such calibration is usually done in the factory and the set of curves shown in FIG. 2 is supplied to the customer for his use. Data from these curves are then stored in the on site computer 32 illustrated in FIG. 1.

A first calibration curve 60 is obtained by placing several reference samples of sheet material in gap 19 and plotting several points for the curve. As shown in FIG. 2 basis weight, BW, is plotted on the vertical axis and the negative of the logarithm of the transmission ratio, $R_1$ is plotted on the horizontal axis.

Transmission ratio is the ratio of two intensities of received radiation with different materials in the gap 19. For example, the first calibration curve 60 relates basis weight to the transmission ratio $R = I_s^o/I_a^o$, where $I_s^o =$ the radiation intensity with each of the reference in the gap, and $I_a^o =$ the radiation intensity with only air in the gap.

Thereafter, dirt is simulated in the radiation path, and the same samples are again measured and the results plotted to produce an artificailly displaced calibration curve 61. Dirt may be simulated by placing a material in the radiaiton path, as is done in the preferred embodiment or alternatively by changing the temperature of the air column of the path or by changing the geometry.

In this case the transmission ratio, $R, = I_s^b/I_a^b$ where $I_s^b$ is the intensity with dirt, or bias material, in the gap and $I_a^b$ is the intensity with only bias material and air in the gap.

Normally when the basis weight gauge is placed in use the calibration curve 60 will be shifted or displaced due to both dirt buildup as discussed above and air temperature or pressure changes. In the present state of the art, however, it cannot be ascertained whether the drift is due exclusively to air temperature, exclusively to dirt buildup, for example, on the window of the radiation source or exactly what proportional share may be due to both effects. However, it has been discoverd that drift due to either air temperature or pressure or dirt appear to function or produce equivalent changes. Thus, compensation or standardization for one effect will compensate for the other.

After curves 60 and 61 have been constructed, a standardization curve 62 is constructed by determining the difference between the curves 60 and 61, measured vertically. That is, for a plurality of values of $-\ln R$, the basis weight shown on curve 60 is subtracted from the basis weight shown on curve 61, and the differences are used to construct curve 62. In practive the curves 60, 61 and 62 can be plotted by hand, or a computer can be utlized. If a computer is used, an equation is first determined which reasonably represents the curves 60 and 61. Then the measured values of R and BW are input into the computer, which uses a conventional curve-fitting routine to determine the coefficients of the equation corresponding to the measured values. After the coefficients have been determined for the curves 60 and 61, the computer then calculates an equation of the curve 62 representing the difference between curves 60 and 61.

With the foregoing data the basis weight gauge utilizing the present invention has now been fully calibrated. The crucial information contained in the curves of FIG. 2 are then stored in the customer's computer and the following use made of this information.

During operation of the system at the customer's facility it is necessary to periodically standardize the system to compensate for the build up of dirt on the gauging heads 17 and 18. The standardization curve 62, stored in the computer, is updated for the effects of current ambient conditions including the effects of air density and dirt buildup in the radiation path. The updating includes scanning offsheet of the material 14 and developing the function DFRAC which is approximately described by:

$$DFRAC = \ln(Fn) - \ln(Fc)/\ln(FD) - \ln(Fc)$$

FN = the standardize transmission ratio. The standardize transmission is $I_f/I_a$ where $I_f$ is the radiation with the flag or standard means 51 in the gap and $I_a$ is the radiation intensity with only air in the gap, both measured during standardization.

FC = the transmission ratio with the standard in the gap and without the material simulating dirt measured during calibration.

FD = the transmission ratio with the standard and with the material simulating dirt in the gap, measured during calibration.

After the current value of DFRAC has been computed a correction factor C is calculated where:

$$C = \Delta BW (DFRAC)$$

where $\Delta BW =$ the difference between curves 60 and 61 corresponding to the present measured value of R, according to the function which represents the standardization curve 62. The present measured value of $R = I_s/I_a$ where $I_s$ is the radiation intensity with the sheet material 14 in the gap, and $I_a$ is the radiation intensity with only air in the gap. Then the correction factor, C is applied to the uncorrected, i.e., measured, basis weight to determine a corrected basis weight.

It should be understood that other functions could be used to describe DFRAC.

We claim:

1. A method of standarizing a basis weight gauge for measuring the weight per unit area of a sheet material, such gauge having a radiation source and radiation detector with a gap therebetween for directing radiation along a path towards said material and for detecting the amount of radiation transmitted through said material, said transmitted radiation being a measure of the basis weight of said material, said gauge also including standard means having a predetermined and stable basis weight and movable to be interposed in said radiation path, said method comprising the following steps:
   (a) constructing two calibration curves each showing basis weight on a first axis versus a function of transmission ratio on a second axis, the first calibration curve being constructed without simulated dirt and the second calibration curve being constructed with simulated dirt;
   (b) constructing a standardization curve by plotting the displacement of one calibration curve relative to the other
   (c) operating the gauge to measure the weight per unit area of the sheet material by determining a measured transmission ratio;
   (d) standardizing the gauge during operation, the standardizing step including determining a correction factor C, based upon the value of the standardization curve at a point corresponding to the measured transmission ratio.

2. A method according to claim 1 wherein the point corresponding to the measured transmission ratio is the value of the standardization curve at the negative of the natural logarithm of the measured transmission ratio.

3. A method of standardizing a basis weight gauge for measuring the weight per unit area of a sheet material, such gauge having a radiation source and radiation detector with a gap therebetween for directing radiation along a path towards said material and for detecting the amount of radiation transmitted through said material, said transmitted radiation being a measure of the basis weight of said material said gauge also including standard means having a predetermined and stable basis weight and movable to be interposed in said radiation path, said method including the following steps:
   (a) providing a plurality of reference samples each having a measured basis weight;
   (b) sequentially placing said reference samples in said gap and obtaining measurements of the radiation transmitted through said samples;
   (c) constructing a first calibration curve from said measurement of said samples said curve relating the variable, basis weight on a first axis as a function of the transmission ratio on the second axis;
   (d) constructing a second calibration curve by sequentially placing said reference samples and material simulating dirt in said gap and measuring the transmitted radiation;
   (e) placing said standard in said gap with said material simulating dirt and without said material simulating dirt and measuring the transmitted radiation in each case;
   (f) constructing a standardization curve representing the difference between the first calibration curve and the second calibration curve;
   (g) placing the standard means in the gap without the sheet material in the gap and determining the standardize transmission ratio;
   (h) placing the sheet material in the gap and measuring the transmitted radiation and removing the sheet material and measuring the radiation to determine a measured transmission radio and an uncorrected basis weight;
   (i) determining a correction factor, C, based upon the standardize transmission ratio and upon the value of the standardization curve at a point corresponding to the measured transmission ratio; and
   (j) applying the correction factor to the uncorrected basis weight to determine a corrected basis weight.

4. A method according to claim 3 wherein the correction factor C is determined by:
   (a) applying the standardize transmission ratio to the standardization curve to determine the corresponding $\Delta BW$;
   (b) calculating a DFRAC value according to the following:

$$DFRAC = \ln(Fn) - \ln(Fc)/\ln(FD) - \ln(Fc)$$

where:
   FN = the standardize transmission ratio,
   FC = the transmission ratio with the standard in the gap and without the material simulating dirt measured during calibration,
   FD = the transmission ratio with the standard and with the material simulating dirt in the gap, measured during calibration,
   (c) calculating C according to:

$$C = DFRAC (\Delta BW).$$

5. A system for standardizing a basis weight gauge for measuring the weight per unit area of a sheet material, such gauge having a radiation source and radiation detector with a gap therebetween for directing radiation along a path towards said material and for detecting the amount of radiation transmitted through said material, said transmitted radiation being a measure of the basis weight of said material, said gauge also including standard means having a predetermined and stable basis weight and movable to be interposed in said radiation path, said system comprising:
   (a) means for constructing two calibration curves each showing basis weight on a first axis versus transmission ratio on a second axis, the first calibration curve being constructed without simulated dirt and the second calibration curve being constructed with simulated dirt;
   (b) means for constructing a standardization curve by plotting the displacement of one calibration curve relative to the other;
   (c) means for placing the standard means in the gap without the sheet material in the gap and determining the standardize transmission ratio;
   (d) means for measuring transmitted radiation with sheet material in the gap and without the sheet material in the gap and means to determine a measured transmission ratio based upon said measurements;
   (e) means for determining a correction factor based upon the value of the standardization curve at a point corresponding to the measured transmission ratio; and
   (f) means for applying the correction factor to the uncorrected basis weight to determine a corrected basis weight.

6. A system for standardizing a basis weight gauge for measuring the weight per unit area of a sheet material such gauge having a radiation source and radaition detector with a gap therebetween for directing radiation along a path towards said material and for detecting the amount of radiation transmitted through said material, said transmitted radiation being a measure of the basis weight of said material said gauge also including standard means having a predetermined and stable basis weight and movable to be interposed in said system comprising:

(a) a plurality of reference samples each having a measured basis weight;

(b) means for sequentially placing said reference samples in said gap and obtaining measurements of the radiation transmitted through said samples;

(c) means for constructing a first calibration curve from said measurement of said samples said curve relating the variable, basis weight on a first axis as a function of the transmission ratio on the second axis;

(d) means for constructing a second calibration curve by sequentially placing said reference samples and material simulating dirt in said gap and measuring the transmitted radiation;

(e) means for placing said standard in said gap with said material simulating dirt and without said material simulating dirt and measuring the transmitted radiation in each case;

(f) means for constructing a standardization curve representing the difference between the first calibration curve and the second calibration curve as a function of the transmission ratio;

(g) means for placing the sheet material in the gap and measuring the transmitted radiation and removing the sheet material and measuring the radiation to determine a measured transmission ratio and an uncorrected basis weight;

(h) means for placing the standard means in the gap without the sheet material in the gap and determining the standardize transmission ratio;

(i) means for determining a correction factor, C, based upon the value of the standardization curve at a point corresponding to the measured transmission ratio; and (j) means for applying the correction factor to the uncorrected basis weight to determine a corrected basis weight.

7. A system according to claim 6 including means to determine correction factor C by:

(a) applying the standardize transmission ratio to the standardization curve to determine the corresponding $\Delta BW$;

(b) calculating a DFRAC value according to the following:

$$DFRAC = ln(Fn) - ln(Fc)/ln(FD) - ln(Fc)$$

where:

FN = the standardize transmission ratio,

FC = the transmission ratio with the standard in the gap and without the material simulating dirt measured during calibration, FD = the transmission ratio with the standard and with the material simulating dirt in the gap, measured during calibration, (c) calculating C according to:

$$C = DFRAC (\Delta BW).$$

8. A method of standardizing a basis weight gauge for measuring the weight per unit area of a sheet material, such gauge having a radiation source and radiation detector with a gap therebetween for directing radiation along a path towards said material and for detecting amount of radiation transmitted through said material, said transmitted radiation being a measure of the basis weight of said material, said gauge also including standard means having a predetermined and stable basis weight and movable to be interposed in said radiation path, said method comprising the following steps:

(a) determining the values of transmission ratio, R, corresponding to a plurality of values of basis weight, BW, without simulated dirt in the radiation path;

(b) determining the coefficients of a first equation fitted to the values of BW and a function of the values of R representing a first curve with BW on the first axis and R on the second axis;

(c) determining the values of R corresponding to a plurality of values of BW, with simulated dirt in the radiation path;

(d) determining the coefficients of a second equation fitted to the values of BW and a function of the values of R representing a second curve with BW on the first axis and R on the second axis;

(e) determine a plurality of points on a standardization curve representing the difference between the first curve and the second curve; and (f) operating the gauge to measure the weight per unit area of the sheet material by determining a measured transmission ratio;

(g) standardizing the gauge during operation by:

(i) placing the standard means in the gap without the sheet material in the gap and determining the standardize transmission ratio;

(ii) determining a correction factor based upon the standardize transmission ratio; and (iii) applying the correction factor to the uncorrected basis weight to determine a corrected basis weight. the standardizing step including determining a correction factor based upon the value of the standardization curve at at a point corresponding to the measured transmission ratio.

* * * * *